Feb. 14, 1956   L. BROOKS   2,734,799
METHOD OF PRODUCING HIGH PURITY GRAPHITE
Filed Feb. 20, 1946
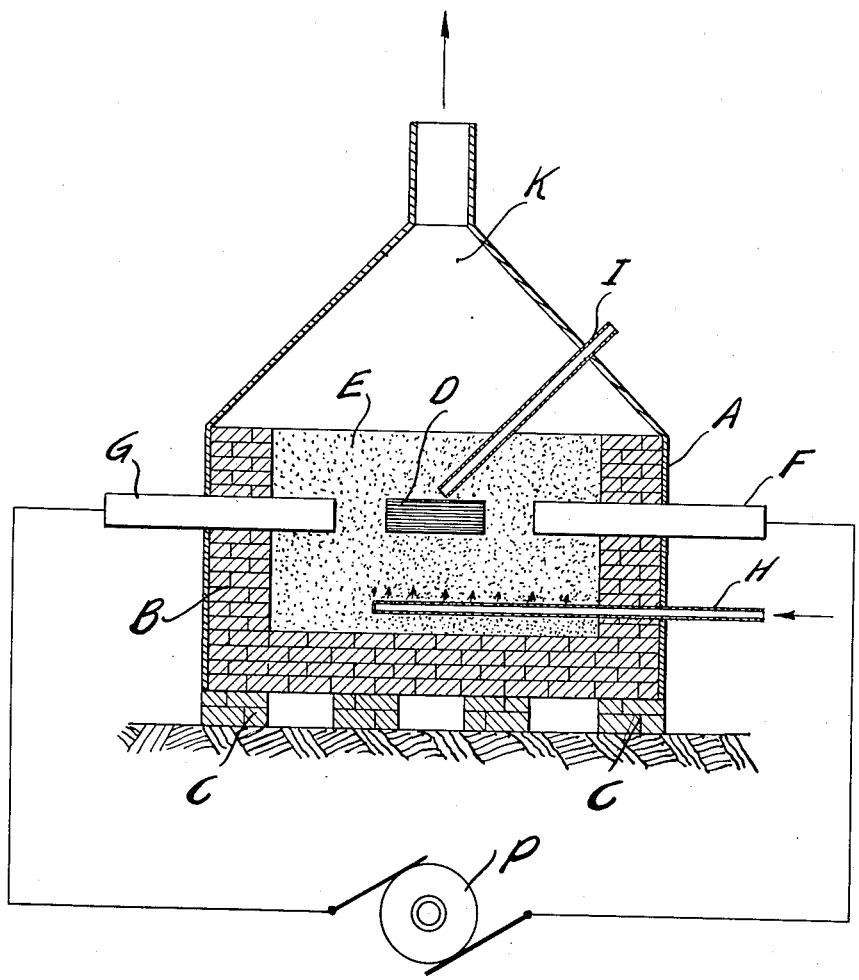
INVENTOR.
Lynn Brooks.
BY Frank C. Learman
Attorney.

United States Patent Office 2,734,799
Patented Feb. 14, 1956

2,734,799
METHOD OF PRODUCING HIGH PURITY GRAPHITE

Lynn Brooks, Bay City, Mich., assignor to United Carbon Products Co., Bay City, Mich.

Application February 20, 1946, Serial No. 649,032

7 Claims. (Cl. 23—209.1)

The invention relates to improvements in a method of producing graphite of high purity.

It is an object of the invention to produce a high purity graphite particularly adapted for making therefrom electrodes used for welding, lighting and for work involving spectrochemical analysis.

It is another object of the invention to produce a high purity graphite from a carbonaceous material by nucleation of the amorphous carbon mass.

Still another object of the invention is to perform the nucleation of the amorphous carbon mass by a chemical reaction which liberates graphite dispersed throughout the mass.

Other objects of the invention will be apparent from the following description with reference to the accompanying drawing.

The single figure of the drawing illustrates by way of example in sectional elevation one type of a furnace which may be employed in practicing the method of the invention.

In accordance with the invention a high purity graphite may be rapidly produced from ordinary carbonaceous material by nucleation of an amorphous carbon mass. The nucleation is performed by a chemical reaction which liberates graphite dispersed throughout the mass. Such nucleation accelerates the graphitization at a temperature in a range lower than that necessary to graphitize amorphous carbon by heating alone.

Prior to this invention it was generally believed that graphite was produced by the dissocation of carbon from its combination with other elements and that the other elements reform with more carbon and that these compounds are dissociated to give more graphite. It has been discovered, however, that graphitization occurs around free graphite as nuclei.

The present invention is based on my discovery that graphitization of a mass of amorphous carbon will take place to some extent at a temperature lower than that required to dissociate some of the common compounds of carbon such as SiC, $Al_4C_3$, $Fe_3C$, etc. by reacting these compounds with chlorine to produce graphite at a temperature of approximately 1000° C. as shown by the reaction.

SiC+2Cl$_2$→SiCl$_4$+C (graphite)

The graphite produced in this manner serves to nucleate the main mass of amorphous carbon and aids its transformation to the extent that 95 to 100% of it is converted into graphite at 2000° C. within two hours.

Other metal carbides may be employed as nucleating agents and will nucleate in the same manner.

Referring to the drawing, which illustrates by way of example a furnace adapted to be employed for producing the high purity graphite in accordance with the present invention, A indicates a steel shell provided in its interior with a suitable high grade refractory fire brick lining B and is supported on a ventilated refractory course C. The charge D, containing carbon and an agent adapted to produce nuclei of graphite when subjected to a reaction with chlorine, is packed in a pure petroleum coke bed E and is spaced evenly between the graphite lead electrodes F and G which supply an electric current from a suitable power source P which may consist of an electric generator. Placed below the charge D within the same packing of petroleum coke E is a perforated refractory grating H which disperses a gas such as Cl$_2$, H$_2$, etc. admitted into the same throughout the bed E and the charge D. The gases and volatile compounds are removed through the hooded vent K which is arranged at the upper portion of the furnace shell. The temperature produced at the charge D is read by placing a graphite tube I, which is closed at its inner end, next to the charge D and sighting on the bottom of the tube I with an optical pyrometer. Heating is accomplished by the resistance offered by the charge D to the passage of electric current between the electrodes G and F.

A specific example of producing high purity graphite in accordance with the invention is as follows:

First, rods of carbon are formed containing materials adapted to produce nuclei of graphite by reaction with chlorine. The rods are made by extruding a mixture of ground petroleum coke of 200 mesh or more, pitch, and SiC in sufficient quantity so as to react and form about 1 to 4% graphite as nuclei. The rods are baked at a temperature up to 1100° C. by slowly advancing the temperature so as to reduce the tendency of warping and porosity. At 1100° C. the chlorine is added to react with the nucleating agent, which in the present case is SiC, but it could be other metal carbides. The temperature is then advanced until 2000° C. is reached, which temperature is maintained for about two hours. If the chlorine is allowed to flow continuously it will eventually remove the other elements which are present in the graphite as impurities, such as Al, Ca, Fe, Mg, etc. If the impurity is present as an oxide it may react as MgO does in the following example:

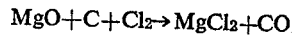

MgO+C+Cl$_2$→MgCl$_2$+CO

The volatile chloride produced condenses in a cooler zone remote from the electrodes.

The mass is then permitted to cool and the graphite produced in this manner is found to have good tensile properties, good coefficient of conductivity, a uniformly dense structure, and very low amounts of impurities. This high purity graphite is excellent for use as electrodes for welding, lighting and especially for work involving spectrochemical analysis.

As already stated previously, it has been discovered by me that the nucleation within the mass of amorphous carbon is responsible for the graphitization of the material instead of a condition of indirect conversion of the carbon to graphite by dissocation of a carbide accompanied by consequent reformation of carbides by the remaining amorphous carbon and the metal vapor until it is all transformed, because the nucleation occurs at a temperature below the dissociation temperature of the carbides which is 1800° C.-2400° C.

What I claim is:

1. In a method of producing high purity graphite, the step of adding to a mass of amorphous carbon a metallic carbide as a nucleating agent which will react with chlorine to form about 1 to 4% graphite as nuclei when the mass is heated to a temperature of about 1100° C., heating said mass of amorphous carbon to which said nucleating agent has been added to said temperature of 1100° C., then adding chlorine to cause the latter to react with the nucleating agent, and thereafter advancing the temperature to about 2000° C. at which temperature the graphite produced serves to nucleate the main mass of amorphous carbon and aids in its transformation to pure graphite.

2. In a method of producing high purity graphite, the step of adding to a mass of amorphous carbon a metallic carbide as a nucleating agent which will react with chlorine to form about 1 to 4% graphite as nuclei when the mass is heated to a temperature of about 1100° C., heating said mass of amorphous carbon to which said nucleating agent has been added to said temperature of 1100° C., then adding chlorine to cause the latter to react with the nucleating agent, and thereafter advancing the temperature to about 2000° C. and maintaining this temperature for about two hours.

3. In a method of producing high purity graphite, the step of adding to a mass of amorphous carbon a metallic carbide as a nucleating agent which will react with chlorine to form graphite as nuclei when the mass is heated to a temperature of about 1100° C., heating said mass of amorphous carbon to which said nucleating agent has been added to said temperature of 1100° C., then adding chlorine to cause the latter to react with the nucleating agent, and thereafter advancing the temperature to about 2000° C. and maintaining this temperature for about two hours.

4. In a method of producing high purity graphite, the step of adding to a mass of ground petroleum coke and pitch a sufficient quantity of SiC as a nucleating agent which will react with chlorine to form about 1 to 4% graphite as nuclei when said mass is heated to a temperature of about 1100° C., heating said mass of ground petroleum coke, pitch and SiC to said temperature of 1100° C., then adding chlorine to cause the latter to react with said SiC, and thereafter advancing the temperature to about 2000° C. and maintaining this temperature for about two hours.

5. In a method of producing high purity graphite, the step of adding to a mass of ground petroleum coke and pitch a sufficient quantity of SiC as a nucleating agent which will react with chlorine to form graphite as nuclei when said mass is heated to a temperature of about 1100° C., heating said mass of ground petroleum coke, pitch and SiC to said temperature of 1100° C., then adding chlorine to cause the latter to react with said SiC, and thereafter advancing the temperature to about 2000° C. and maintaining this temperature for about two hours.

6. A method of producing high purity graphite, comprising the steps of adding to a mass of amorphous carbon a metallic carbide which will react with chlorine to produce graphite nuclei, heating the mass to a temperature of approximately 1100° C. and then adding chlorine to cause the latter to react with the metallic carbide, advancing the temperature to approximately 2000° C. and then maintaining it above the temperature at which the graphite previously produced serves to nucleate the main mass of amorphous carbon and aid in its transformation to graphite.

7. In a method of producing high purity graphite, the steps of adding to a mass of amorphous carbon a compound such as a metallic carbide which will react with chlorine to produce graphite nuclei, heating the mass to a temperature of approximately 1100° C. and then adding chlorine to cause the latter to react with the metallic carbide, and then advancing the temperature to approximately 2000° C. and maintaining it for approximately two hours time.

References Cited in the file of this patent

UNITED STATES PATENTS

| Re. 12,964 | Acheson | June 1, 1909 |
| 2,315,346 | Mitchell | Mar. 30, 1943 |

OTHER REFERENCES

Mellor: Comprehensive Treatise on Inorganic and Theoretical Chemistry, vol. V, New York, 1924, pages 739–740.